(12) United States Patent
Hueber et al.

(10) Patent No.: US 9,806,771 B1
(45) Date of Patent: Oct. 31, 2017

(54) METHOD AND SYSTEM FOR HIGH RESOLUTION TUNING OF THE PHASE FOR ACTIVE LOAD MODULATION IN A NFC SYSTEM

(71) Applicant: NXP B.V., Eindhoven (NL)

(72) Inventors: Gernot Hueber, Linz (AT); Ian Thomas Macnamara, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/225,778

(22) Filed: Aug. 1, 2016

(51) Int. Cl.
*H04B 5/00* (2006.01)
*H04L 27/20* (2006.01)
*H04W 4/00* (2009.01)

(52) U.S. Cl.
CPC ......... *H04B 5/0075* (2013.01); *H04B 5/0037* (2013.01); *H04L 27/20* (2013.01); *H04W 4/008* (2013.01)

(58) Field of Classification Search
CPC ........................... H04B 5/0075; H04B 5/0037
See application file for complete search history.

(56) References Cited

U.S. PATENT DOCUMENTS

| | | | |
|---|---|---|---|
| 9,391,582 B2* | 7/2016 | Desclos | H03H 7/1758 |
| 2011/0059694 A1* | 3/2011 | Audic | H04B 5/00 |
| | | | 455/41.1 |
| 2013/0063220 A1* | 3/2013 | McCune, Jr. | H03C 3/02 |
| | | | 332/103 |

* cited by examiner

*Primary Examiner* — Tuan H Nguyen

(57) ABSTRACT

High resolution tuning of the phase for active load modulation (ALM) in a near field communication (NFC) system is desirable for optimizing the load modulation amplitude. The present disclosure describes that, in one embodiment, high resolution tuning of the phase can be achieved by adjusting the attenuation factor of a radio frequency (RF) attenuator in the NFC system.

20 Claims, 8 Drawing Sheets

METHOD AND SYSTEM FOR HIGH RESOLUTION TUNING OF THE PHASE FOR ACTIVE LOAD MODULATION IN A NFC SYSTEM

FIELD

The described embodiments relate generally to methods and systems for NFC (near field communication), and more particularly to methods and systems that provide for high resolution tuning of the phase for active load modulation (ALM) in a near field communication (NFC) system.

BACKGROUND

The use of Near Field Communication (NFC) is becoming common place in applications such as contactless payment systems, security access systems, etc. A typical NFC based system consists of a NFC reader (e.g., Point of Sale terminal) and a NFC device, typically a NFC enabled card or a mobile phone.

Furthermore, a NFC device typically can be configured for either passive load modulation (PLM) or active load modulation (ALM). While, ALM is typically more complex than PLM, components for implementing ALM in a transponder (e.g., a mobile device) can be more compact and, because the transponder utilizes a power source to generate a magnetic field rather than just modulate a magnetic field created by a reader, an ALM transponder can have greater communication distance than a PLM transponder.

In order to perform a transaction using a NFC enabled device and a NFC reader, the NFC enabled device is brought near the NFC reader. The communication between the NFC enabled device and the NFC reader may fail if the NFC reader fails to properly demodulate the signal from the NFC enabled device. Such failures may occur if the NFC enabled device is not properly aligned with the NFC reader or if the NFC enabled device is not within a certain distance range from the NFC reader.

Such failures and other issues can be significantly reduced if there is tuning of the phase for active load modulation (ALM) in a NFC enabled device. Therefore, it is desirable to have methods and systems that provide for tuning (and, in particular, high resolution tuning) of the phase for active load modulation (ALM) in a near field communication (NFC) system.

SUMMARY

Tuning of the phase for active load modulation (ALM) in a near field communication (NFC) system is desirable for optimizing the load modulation amplitude. In particular, the transmitter (TX) phase is tuned for optimizing the load modulation amplitude. But, in one embodiment, the TX phase is tuned by an adjustment of the phase lock loop (PLL). Therefore, the phase setting granularity is limited by the granularity of the PLL settings, resulting in a potentially low resolution tuning of the phase. It is, therefore, desirable to achieve, through other means, high resolution tuning of the phase for active load modulation (ALM) in a near field communication (NFC) system. In one embodiment, high resolution tuning of the phase can be achieved by adjusting the phase configuration of a radio frequency (RF) attenuator in the NFC system.

The present invention provides for a method for enhancing phase tuning resolution of a communications device that communicates via inductive coupling, the method comprising: (a) adjusting a phase configuration of the communications device in response to at least one system or environmental parameter; (b) modulating a carrier signal with the adjusted phase configuration using active load modulation (ALM); and (c) transmitting the modulated carrier signal from the communications device for inductive coupling; wherein adjusting the phase configuration of the communications device comprises adjusting an attenuation factor of a radio frequency (RF) attenuator of the communications device.

In some embodiments, the adjusting the attenuation factor of the radio frequency (RF) attenuator of the communications device provides for high resolution phase tuning.

In some embodiments, the radio frequency (RF) attenuator is configured to attenuate input voltage to an analog receiver of the communications device.

In some embodiments, the radio frequency (RF) attenuator is configured to maintain input voltage to an analog receiver of the communications device within a given range, wherein the given range does not overload the analog receiver or provide an input voltage that is too low.

In some embodiments, the attenuation factor of the radio frequency (RF) attenuator is adjusted by changing an impedance ratio.

In some embodiments, the radio frequency (RF) attenuator is comprised of two impedances, wherein at least one of the two impedance is a tunable impedance.

In some embodiments, the radio frequency (RF) attenuator is comprised of a fixed impedance and a tunable impedance in series, wherein the tunable impedance comprises a $R_{agc}$ (automatic gain control resistance) in parallel with a capacitance, wherein the $R_{agc}$ is a variable resistor.

In some embodiments, the $R_{agc}$ is comprising of a bank of resistors controlled by transistors.

In some embodiments, the $R_{agc}$ has a very fine step resolution that allows for a phase tuning of less than 0.1 degree.

In some embodiments, the at least one system or environmental parameter is selected from the group consisting of: a field strength of inductive coupling; a coupling condition of inductive coupling; an antenna geometry of the communications device or a corresponding reader device; a process, voltage and temperature (PVT) variation of the communications device; a system architecture of the communications device; a matching network characteristic of the communications device; a communications protocol of the communications device; a communications data rate of the communications device; a retransmission configuration of the communications device; a reconfiguration setting of the communications device; a communications timing of the communications device; and an application of the communications device.

In some embodiments, the adjusting the phase configuration of the communications device comprises adjusting the phase configuration of the communications device according to a function of a group of system or environmental parameters.

In some embodiments, the adjusting the phase configuration of the communications device comprises adjusting a phase configuration of a clock generation circuit of the communications device.

The present invention also provides for a system for enhancing phase tuning resolution of a communications device that communicates via inductive coupling, the system comprising: (a) a phase configuration adjustment module configured to adjust a phase configuration of the communications device in response to at least one system or environmental parameter; (b) a signal modulation module configured to modulate a carrier signal with the adjusted phase configuration using active load modulation (ALM); (c) a signal transmission module configured to transmit the modulated carrier signal from the communications device for inductive coupling; and (d) a radio frequency (RF) attenuator configured to attenuate input signal to an analog receiver by an attenuation factor, wherein the phase configuration adjustment module is further configured to adjust the attenuation factor of the radio frequency (RF) attenuator.

In some embodiments, the adjusting the phase configuration of the radio frequency (RF) attenuator provides for high resolution phase tuning.

In some embodiments, the radio frequency (RF) attenuator is configured to maintain input voltage to the analog receiver of the communications device within a given range, wherein the given range does not overload the analog receiver or provide an input voltage that is too low.

In some embodiments, the radio frequency (RF) attenuator is comprised of two impedances, wherein at least one of the two impedance is a tunable impedance.

In some embodiments, the radio frequency (RF) attenuator is comprised of a fixed impedance and a tunable impedance in series, wherein the tunable impedance comprises a $R_{agc}$ (automatic gain control resistance) in parallel with a capacitance, wherein the $R_{agc}$ is a variable resistor.

In some embodiments, the $R_{agc}$ comprises a bank of resistors controlled by transistors.

The present invention further provides a computer program product encoded in a non-transitory computer readable medium for enhancing phase tuning resolution of a communications device that communicates via inductive coupling, the computer program product comprising: (a) computer code for adjusting a phase configuration of the communications device in response to at least one system or environmental parameter; (b) computer code for modulating a carrier signal with the adjusted phase configuration using active load modulation (ALM); and (c) computer code for transmitting the modulated carrier signal from the communications device for inductive coupling; wherein adjusting the phase configuration of the communications device comprises adjusting an attenuation factor of a radio frequency (RF) attenuator of the communications device.

In some embodiments, the adjusting the phase configuration of the radio frequency (RF) attenuator of the communications device provides for high resolution phase tuning.

The present invention has one or more of the following advantages: (1) The invention can be implemented using a "pure" software solution/enhancement rather than in need of highly sophisticated and/or accurate hardware (especially PLLs). (2) The invention can be implemented on currently available hardware. (3) The invention can result in a reduction of eBOM (engineering bill of materials) as components with higher tolerance can be used for the manufacture of components, such as the antenna and matching circuitry. (4) The use of the invention can avoid costly resonance tuning in user (e.g., customer) production. (5) The invention can increase robustness in communication stability (and avoid zones of no communication) with critical readers already established in the market only supporting envelope detection. (6) The invention can enable certification of standards that use readers based on receivers with envelope detection. (7) The invention can increase user experience by ensuring consistent performance over production and system conditions. (8) The invention can enable recovery mechanisms. (9) The invention can allow phase characteristics for specific cases (such as protocol, application, and the like). (10) The invention can compensate IC behavior (PVT). (Note: IC denotes integrated circuit. PVT denotes process, voltage and temperature.)

The above summary is not intended to represent every example embodiment within the scope of the current or future Claim sets. Additional example embodiments are discussed within the Figures and Detailed Description below.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Representative devices and methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other embodiments are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Active load modulation (ALM) is state of the art for all mobile NFC solution in the market. In one embodiment, ALM is an actively sending of 13.56 MHz signal modulated according to standards for Type A/B/F. This grants a huge benefit in generated signal strength and allows for the use of smaller antennas by fulfilling the required standards like NFC Forum, ISO 14443, EMVCo, etc. with respect to load modulation amplitude parameter.

Figure 2:
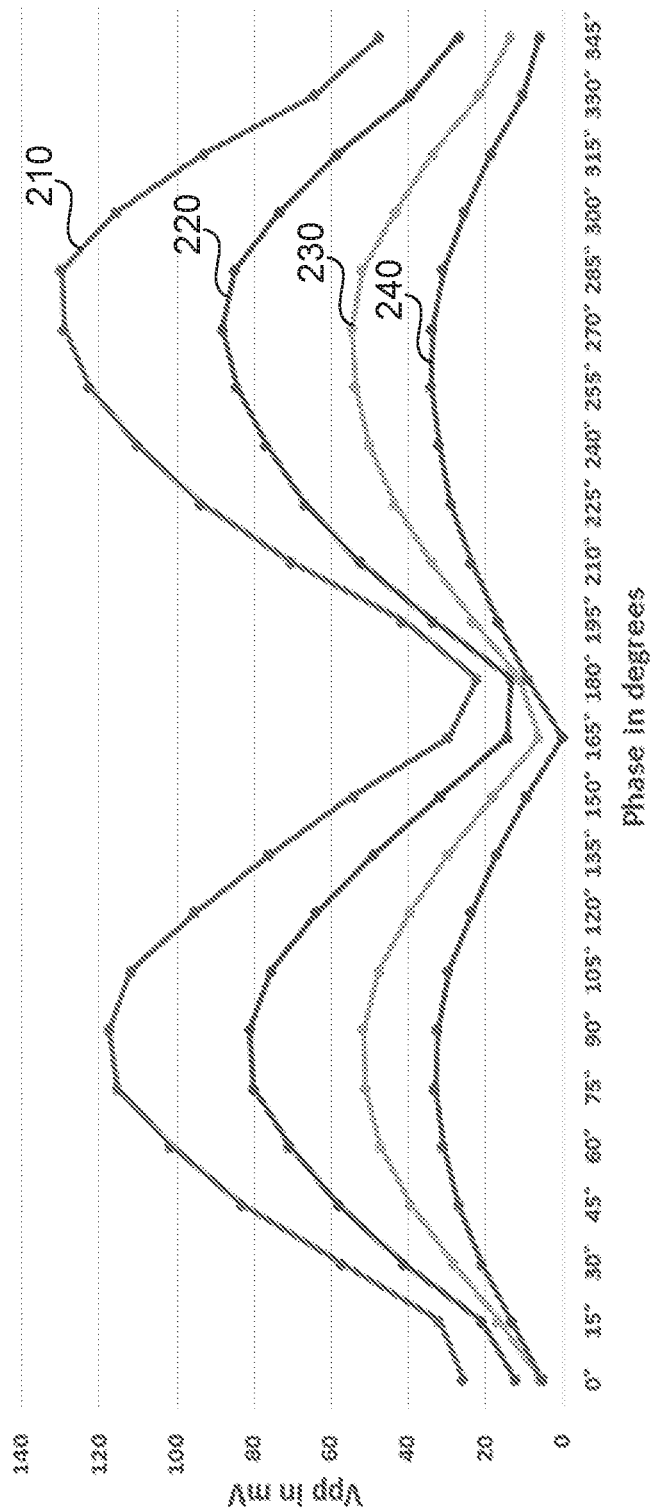
FIG. 2 shows a diagram of load modulation amplitudes versus example phase configurations of the communications device depicted in FIG. 1 under different inductive coupling conditions.

A dedicated initial phase can be defined for the card response for all cases of ALM. The initial phase setting can be used to optimize the load modulation amplitude as shown in FIG. 2 for different coupling positions shown as "210", "220", "230", and "240". In FIG. 2, the x-axis can represent the initial phase setting in degrees (i.e., phase of ALM versus TX CW (transmitter carrier wave) signal phase). FIG. 2 shows the load modulation amplitude peaking for some phase values. Therefore, in one embodiment, the phase can be used to optimize the load modulation amplitude.

There are many reference communication counterparts in the field (and certification test) which are strongly amplitude dependent, e.g. some FeliCa readers and older payment terminals. Therefore, adjusting the phase to optimize the load modulation amplitude can be a great help for use with these counterparts (e.g. some FeliCa readers and older payment terminals).

The transmitter (TX) phase (phase relation from reader field as seen on the RX (receiver) and the phase of the carrier at the TX) of the NFC system depends on multiple system and/or environmental parameters/conditions (e.g., field strength, detuning/coupling condition, antenna geometries, IC (PVT) (integrated circuit—process, voltage and temperature), matching network (topology, . . . ), protocol, data-rate, retransmission, reconfiguration, timings, applications, etc.

The TX (transmitter) phase that can be used for a platform is defined by a measurement campaign with multiple reader terminals. There is a TX phase range that gives a passing communication for all readers (as, for example, defined in IOT (Interoperability Test) certification). In one embodiment system, the TX phase is dialed in by a register and modifies to a TX phase by adjustment of the phase lock loop (PLL). As the setting granularity is limited by the number of PLL dials, there can be a quantization of the optimal TX phase due to available settings. In practice, the phase range can be small, so quantization can be a limiting factor. Therefore, higher resolution tuning of the phase for active load modulation (ALM) in a near field communication (NFC) system is desirable. In one embodiment, high resolution tuning of the phase for ALM in a NFC system is achieved by adjusting the phase configuration of a radio frequency (RF) attenuator in the NFC system.

Accordingly, the following detailed descriptions and figures provide further disclosures on various embodiments of methods and systems for achieving high resolution tuning of the phase for ALM in a NFC system.

Figure 1:
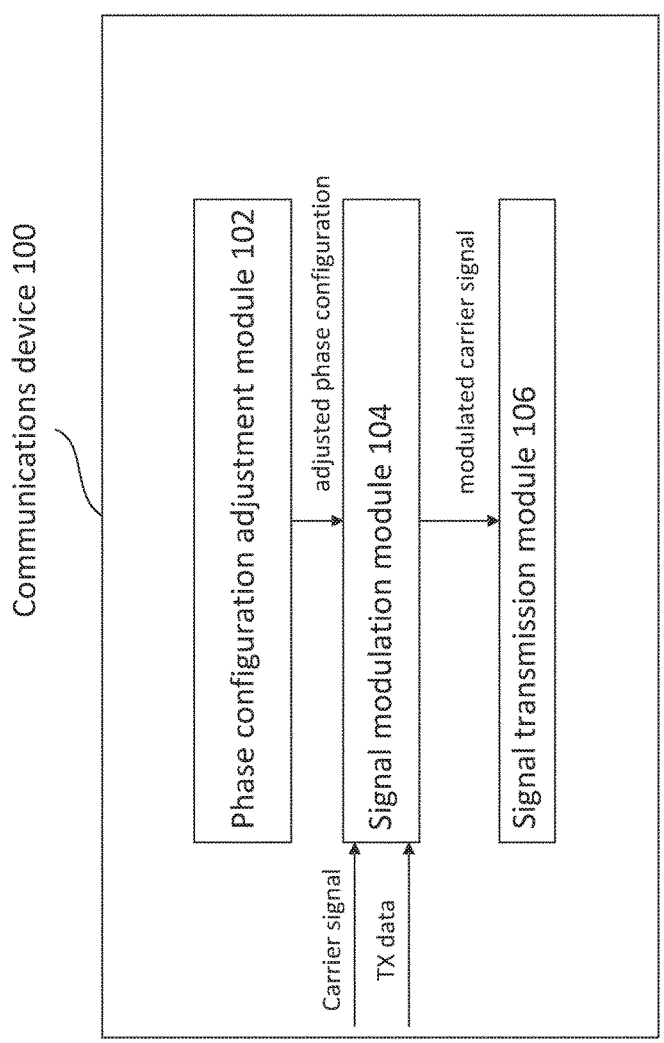
FIG. 1 shows a functional block diagram depicting an embodiment of a communications device of the present invention.

FIG. 1 is a functional block diagram of a communications device 100 in accordance with an embodiment of the invention. In the embodiment depicted in FIG. 1, the communications device communicates via inductive coupling. The communications device may include a phase configuration adjustment module 102, a signal modulation module 104, and a signal transmission module 106. The communications device may be an integrated circuit (IC) device. For example, the communications device may be implemented in a handheld computing system. In some embodiments, the communications device is implemented in a mobile computing system, such as a mobile phone. The communications device may be a near field communications (NFC) device that utilizes inductive coupling to communicate. In some embodiments, the communications device is implemented as an RF transponder compatible with the International Organization for Standardization (ISO)/the International Electrotechnical Commission (IEC) 14443 standard. Although the illustrated communications device is shown with certain components and described with certain functionality herein, other embodiments of the communications device may include fewer or more components to implement the same, less, or more functionality.

In the embodiment depicted in FIG. 1, the phase configuration adjustment module 102 is configured to adjust a phase configuration of the communications device in response to at least one system or environmental parameter. The phase configuration of the communications device may reflect an input/output phase behavior of the communications device. For example, the phase configuration of the communications device may be a relative phase setting between the received signal phase and the carrier phase of the response. Different readers (e.g., readers of different manufacturers, readers of different models, readers of different types) may have different antennas, different matching networks, and different relative locations with respect to the communications device can impact the channel and thus the channel phase between the communications device and the reader. Adjusting the phase configuration based on one or more system or environmental parameters to achieve a phase setting with good signal noise ratio (SNR) can provide robust communications across different readers and different inductive coupling positions.

Examples of system or environmental parameters used by the phase configuration adjustment module 102 may include, without being limited to, a field strength of inductive coupling, a coupling condition of inductive coupling, an antenna geometry of the communications device or a corresponding reader device, a process, voltage and temperature (PVT) variation of the communications device, a system architecture of the communications device, a matching network characteristic of the communications device, a communications protocol of the communications device, the communications data rate of the communications device, a retransmission configuration of the communications device, a reconfiguration setting of the communications device, a communications timing of the communications device, and an application of the communications device. The at least one system or environmental parameter may include a combination of two or more system or environmental parameters as listed above. In some embodiments, the phase configuration adjustment module is further configured to adjust the phase of the carrier signal according to a function of a group of system or environmental parameters.

The phase configuration adjustment module 102 may be configured to adjust the transmission carrier phase configuration of the communications device 100 before a transmission of a data frame or adjust the transmission carrier phase configuration of the communications device statically, dynamically, or "on-the-fly" during a transmission of a data frame. In some embodiments, the phase configuration adjustment module is configured to adjust the transmission carrier phase configuration of the communications device after production but before being distributed to consumers/end users. In some embodiments, the at least one system or environmental parameter is obtained during a startup of the communications device or before each data frame transmission.

In the embodiment depicted in FIG. 1, the signal modulation module 104 is configured to modulate a carrier signal with the adjusted phase configuration using ALM. The signal transmission module may include a clock recovery circuit and an analog transmitter.

In the embodiment depicted in FIG. 1, the signal transmission module 106 is configured to transmit the modulated carrier signal from the communications device for inductive coupling. The signal transmission module may include an induction type antenna such as a loop antenna.

In some embodiments, the communications device 100 is an active load modulation (ALM) device. In such embodiments, the signal transmission module can be configured to generate its own magnetic field for transmitting the outgoing RF using a current source, which results in greater communications distances. When the communications device and a corresponding reader device both generate a magnetic field, the inductive coupling between the communications device and the corresponding reader device can be affected by one or more system or environmental parameters. Consequently, the magnetic fields may be misaligned because of one or more system or environmental parameters. The misalignment in magnetic fields can decrease the signal strength in the amplitude portion of the modulation, resulting in lower communications performance (e.g., lower SNR). Typically, in order to prevent the magnetic fields of an ALM device and a reader from becoming misaligned and interfering with one another (e.g., to maintain a constant phase during transmission), components with very low error-tolerance are used in the transponder. In the embodiment depicted in FIG. 1, a phase configuration of the communications device is adjusted in response to at least one system or environmental parameter. Because the phase configuration of the communications device is adjusted in response to at least one system or environmental parameter, components with greater error-tolerance can be used in the RFID device while still maintaining the desired phase arrangement during transmission. In addition, resonance tuning of devices in mass production can be reduced or even avoided. Further, the robustness in communications stability for certain types of reader devices (e.g., reader devices based on envelope detection) can be improved. Additionally, user experience can be boosted by providing more consistent performance over various production, system, protocol, and application conditions. Further, variations in IC behavior due to PVT can be compensated for.

FIG. 2 depicts a diagram of load modulation amplitudes versus example phase configurations of the communications device 100 depicted in FIG. 1 under different inductive coupling conditions. In the diagram of FIG. 2, the phase configurations of the communications device 100 are initial relative phase settings between the received signal phase versus the carrier phase in degrees and the load modulation amplitudes are in millivolts (mV). As depicted in FIG. 2, four curves 210, 220, 230, 240 represent four different inductive coupling conditions. For each inductive coupling condition, the load modulation amplitude initially increases with an increase in phase until a first peak, subsequently decreases with an increase in phase until a lowest point, then increases with an increase in phase until a second peak, and subsequently decreases with an increase in phase. However, for different inductive coupling conditions, peaks of the load modulation amplitudes occur at different phases. By statically or dynamically adjusting the phase, a peak in load modulation amplitude (i.e., output signal amplitude from the communication device) can be achieved for a respective inductive coupling condition.

Figure 3:
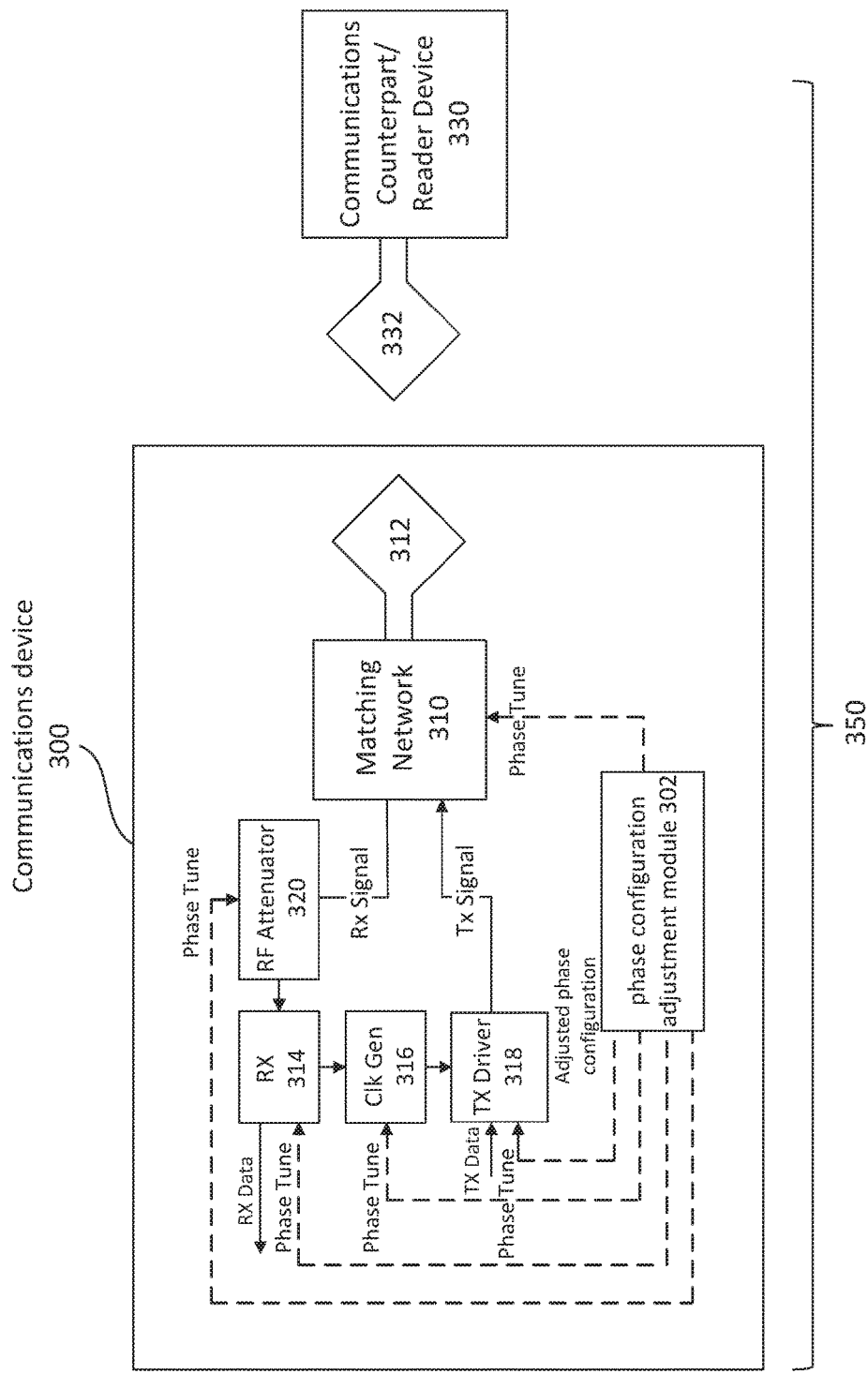
FIG. 3 shows an embodiment of the communications device depicted in FIG. 1 with a corresponding reader device to form an inductively coupled communications system.

FIG. 3 depicts an embodiment of the communications device 100 depicted in FIG. 1 that can be used with a corresponding reader device 330 to form an inductively coupled communications system 350. In some embodiments, corresponding device 330 can be a dedicated reader device. In some embodiments, corresponding device 330 can be a communications counterpart device (as an example: a mobile phone). In some embodiments, corresponding device 330 can be a communications counterpart device (as an example: a mobile phone) operating in reader mode. In the embodiment depicted in FIG. 3, a communications device 300 includes a phase configuration adjustment module 302, a matching network 310 that is coupled to an antenna 312, an analog receiver "RX" 314, a clock generation circuit 316, an analog transmitter "TX" 318, and an RF attenuator 320. The antenna may be an induction type antenna such as a loop antenna. In an example operation of the communications device, a radio-frequency (RF) signal is received by the antenna via inductive coupling from an antenna 332 of the corresponding reader device 330 and is passed to the analog receiver to convert the RF signal into a digital signal. A signal is generated from the RF signal by the clock generation circuit and is used to produce an outgoing RF signal at the analog transmitter, which is transmitted via inductive coupling using the antenna. The communications device 300 depicted in FIG. 3 is one possible embodiment of the communications device 100 depicted in FIG. 1. However, the communications device depicted in FIG. 1 is not limited to the embodiment shown in FIG. 3.

In some embodiments, the communications device 300 is an active load modulation (ALM) device. In these embodiments, the antenna can be configured to generate its own magnetic field for transmitting the outgoing RF using a current source, which can result in greater communications distances than PLM devices. In the embodiment depicted in FIG. 3, a phase configuration of the communications device is adjusted in response to at least one system or environmental parameter. Because the phase configuration of the communications device is adjusted in response to at least one system or environmental parameter, components with greater error-tolerance can be used in the RFID device while still maintaining the desired phase arrangement during transmission. A corresponding reader device is capable of demodulating the signal because the amplitude of the RF signal captured from the communications device is large enough to be above the sensitivity level of a demodulator of the corresponding reader device but not too large to overdrive the demodulator of the corresponding reader device.

The phase configuration adjustment module 302 can adjust phase configurations in various components of the communications device. The phase configuration adjustment module can adjust phase configurations in various components of the communications device statically, dynamically, or on-the-fly. The phase configuration adjustment module also can adjust phase configurations in various components of the communications device at the time of production and before distribution to consumers/end users. In the embodiment depicted in FIG. 3, the phase configuration adjustment module can adjust phase configurations in the analog receiver "RX" 314, the clock generation circuit 316, the analog transmitter "TX" 318, and/or the RF attenuator 320. Although the illustrated phase configuration adjustment module is shown as being separate from the analog receiver, the clock generation circuit, and the analog transmitter, in some embodiments, the phase configuration adjustment module is implemented within the analog receiver, the clock generation circuit, and the analog transmitter.

Although (in the embodiment depicted in FIG. 3) the phase configuration adjustment module can adjust phase configurations in any combinations of the components (i.e., the analog receiver "RX" 314, the clock generation circuit 316, the analog transmitter "TX" 318, and/or the RF attenuator 320), in one embodiment, a high resolution phase tuning can be achieved by adjusting the phase configuration in the RF attenuator 320. In one embodiment, the highest resolution phase tuning can be achieved by adjusting the phase configuration in the RF attenuator 320. However, the total amount of phase tuning achieved in the other components can be higher. Therefore, in one embodiment, the coarse phase tuning can be performed in the other components (e.g., the analog receiver "RX" 314, the clock generation circuit 316, the analog transmitter "TX" 318), while the fine phase tuning can be performed in the RF attenuator 320. In this regard, in one embodiment, the high resolution phase tuning can be achieved by adjusting phase configurations in the RF attenuator 320, plus any combinations of the analog receiver "RX" 314, the clock generation circuit 316, and the analog transmitter "TX" 318. In one embodiment, the highest amount of phase tuning can be achieved by adjusting the phase configuration in the clock generation circuit 316. Therefore, in this regard, in one embodiment, the high resolution phase tuning can be achieved by adjusting phase configurations in the RF attenuator 320, plus the clock generation circuit 316.

In some embodiments, the phase configuration adjustment module 302 adjusts the phase configuration of the RF attenuator 320 together with the analog receiver "RX" 314. In an embodiment, the phase configuration adjustment module is implemented within the analog receiver as a delay-locked loop (DLL) whose tap points can be selected (e.g., via a multiplexer based on a recovered clock signal) so as to select a particular phase delay. In another embodiment, the phase configuration adjustment module is implemented within the analog receiver as a dedicated phase shifter. In yet another embodiment, the phase configuration adjustment module is implemented within the analog receiver as a tunable filter (e.g., a band-pass filter).

In some embodiments, the phase configuration adjustment module 302 adjusts the phase configuration of the RF attenuator 320 together with the clock generation circuit 316. In an embodiment, the phase configuration adjustment module is implemented within the clock generation circuit as a delay-locked loop (DLL) whose tap points can be adjusted so as to select a particular phase delay. In another embodiment, the phase configuration adjustment module is implemented within the clock generation circuit as a divider stage used with an integer phase-locked loop (PLL) or a fractional PLL that can be tuned to the desired phase setting. In yet another embodiment, the phase configuration adjustment module is implemented within the clock generation circuit as a dedicated phase shifter. In yet another embodiment, the phase configuration adjustment module is implemented within the clock generation circuit as a clock delay line (e.g. as a buffer).

In some embodiments, the phase configuration adjustment module 302 adjusts the phase configuration of the RF attenuator 320 together with the analog transmitter "TX" 318. In an embodiment, the phase configuration adjustment module is implemented within the analog transmitter as an inverter that can invert signals to be transmitted. In another embodiment, the phase configuration adjustment module is implemented within the analog transmitter as a delay element in the clock path. In yet another embodiment, the phase configuration adjustment module is implemented within the analog transmitter as a slew rate control device.

In some embodiments, the phase configuration adjustment module 302 adjusts the phase configuration of the RF attenuator 320, together with the matching network 310. In an embodiment, the phase configuration adjustment module 302 adjusts the phase configuration of the RF attenuator 320 together with the matching network 310 and/or the antenna 312. In another embodiment, the phase configuration adjustment module 302 adjusts the phase configuration of the RF attenuator 320 together with any combinations of the components (i.e., the analog receiver "RX" 314, the clock generation circuit 316, the analog transmitter "TX" 318, the matching network 310, and/or the antenna 312).

In one embodiment, the Rx attenuator can be used as a means for adjusting phase that allows for very fine granularity (i.e., high resolution phase tuning). The Rx attenuator is typically a control loop that has some impact on phase. By fine granular offsetting of the attenuator, the input voltage $V_{rx}$ to the IC is slightly changed, and there is also an impact on the phase delay. In some embodiments, this phase change can even be in the range of 0.1 degree steps, which can be hard to be achieved by other means (e.g., a PLL).

Figure 4:
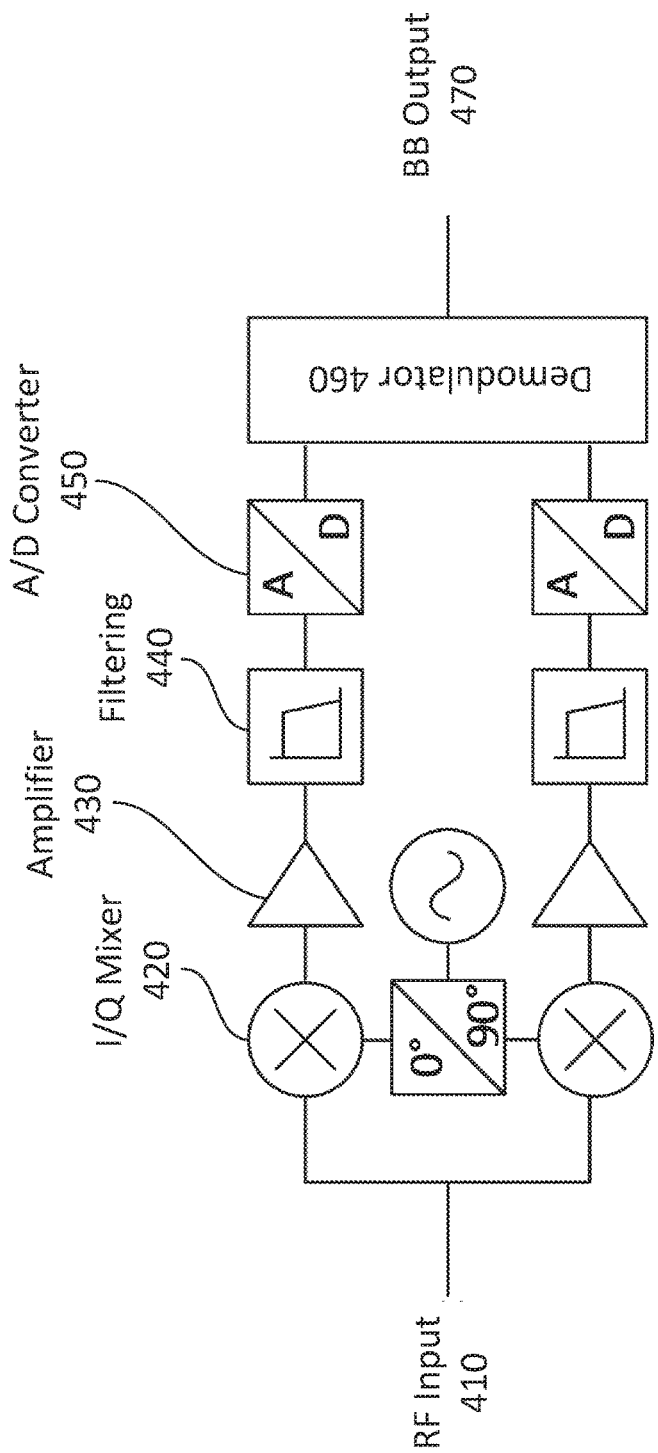
FIG. 4 shows a block diagram of a receiver with I/Q mixer, amplifier, filtering, A/D (analog-to-digital) converter and a signal demodulator in the baseband.

An embodiment of a receiver 314 of the present invention is shown in FIG. 4. The receiver comprises I/Q mixer 420, amplifier 430, filtering 440, A/D converter 450, and a signal demodulator 460. The receiver receives a RF input 410 to the I/Q mixer 420 and generates a BB (baseband) output 470 from the signal demodulator 460.

Figure 5A:
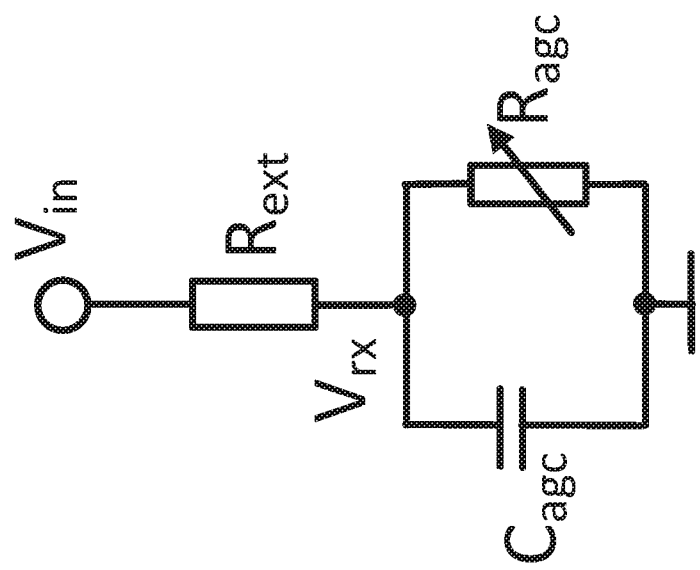
FIG. 5A shows a schematic example of a RF attenuator.

FIG. 5A shows an embodiment of a RF attenuator. In some embodiments, the RF attenuator is configured to attenuate input voltage to an analog receiver of a communications device. In some embodiments, the RF attenuator is further configured to maintain input voltage to an analog receiver of the communications device within a given range, wherein the given range does not overload the analog receiver or provide an input voltage that is too low. In some embodiments, the attenuation factor of the radio frequency (RF) attenuator is adjusted by changing an impedance ratio. In some embodiments, the radio frequency (RF) attenuator is comprised of two impedances, wherein at least one of the two impedance is a tunable impedance.

In particular, FIG. 5A shows an embodiment of a RF attenuator with an input voltage $V_{in}$, resistors $R_{ext}$, $R_{agc}$, for the voltage divider, and capacitance $C_{agc}$ representing the input capacitance of the IC at $V_{rx}$ and board trace capacitances. To make the attenuator tunable in terms of gain, either $R_{ext}$ or $R_{agc}$ (or both) can be tunable. FIG. 5A shows the configuration where $R_{agc}$ is tunable. In one embodiment, $R_{agc}$ is associated with an automatic gain control (AGC). In one embodiment, $R_{agc}$ is comprising of a bank of resistors controlled by transistors. In one embodiment, $R_{agc}$ has a very fine step resolution that allows for a phase tuning of less than 0.1 degree.

In one embodiment, the RF attenuator comprises a fixed impedance and a tunable impedance in series. As an example, in FIG. 5A, a tunable impedance can be a variable resistor (e.g., $R_{agc}$) and a capacitor (e.g., $C_{agc}$) in parallel. In one embodiment, a tunable impedance can be a variable resistor and a variable capacitor in parallel. In one embodiment, a tunable impedance can be any combination of one or more variable resistors and one or more variable capacitor in parallel and/or in series. In one embodiment, the RF attenuator comprises a tunable impedance.

Figure 5B:
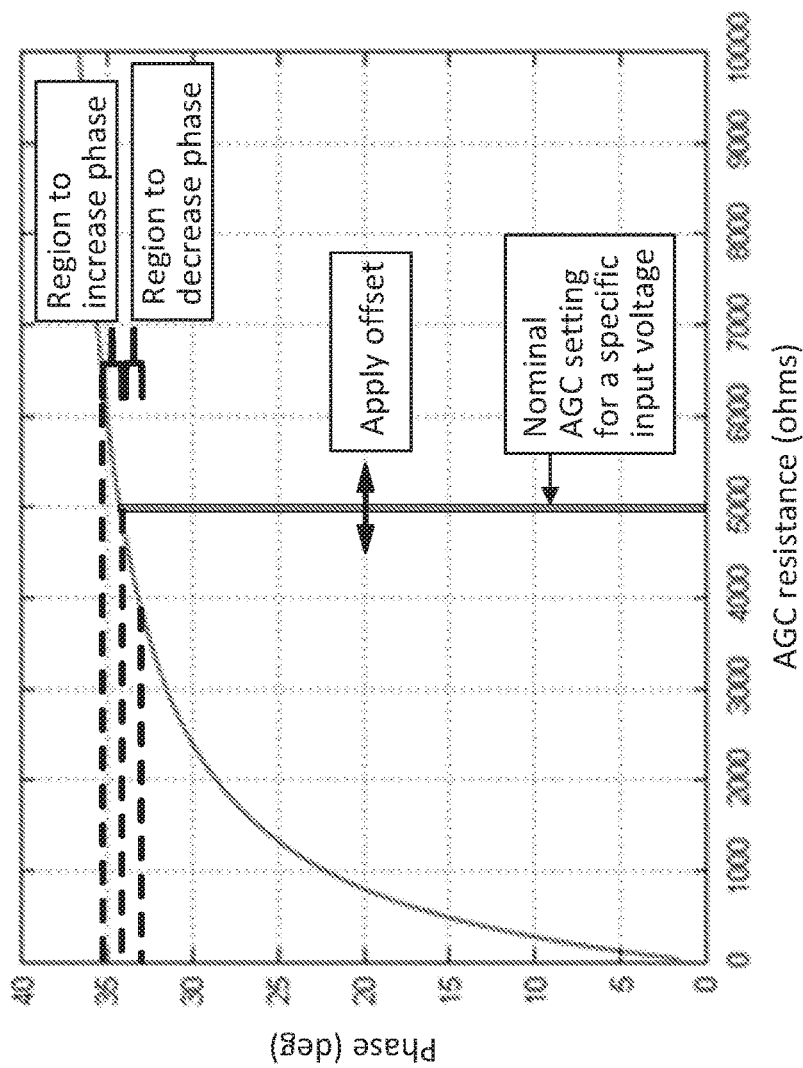
FIG. 5B shows results of a phase response plotted over AGC resistance.

FIG. 5B shows results of a phase response plotted over the AGC (automatic gain control) resistance. FIG. 5B shows a nominal AGC setting for a specific input voltage that is associated with a specific AGC resistancce. By offsetting the nominal AGC resistancce for the specific input voltage (via, for example, firmware and/or hardware control), this offset immediately creates a wanted phase offset. As the AGC resistancce has a very fine step resolution, consequently a fine phase resolution of ~0.1 degree can be achieved. In some embodiments, phase resolution of less than 0.1 degree can be achieved.

In particular, FIG. 5B shows an example of nominal AGC setting for a specific input voltage that is associated with an AGC resistance of 5000 ohms. The curve, which describes the variation of phase offset versus AGC resistance, shows that the phase offset increases as the AGC resistance is increased. Therefore, if a negative AGC resistance offset is applied (i.e., moving AGC resistance to less than 5000 ohms), the phase offset is expected to be decreased. This is the part of the graph that is marked "region to decrease phase". Alternatively, if a positive AGC resistance offset is applied (i.e., moving AGC resistance to more than 5000 ohms), the phase offset is expected to be increased. This is the part of the graph that is marked "region to increase phase". Using this information, it is possible to offset the nominal AGC resistance to achieve a wanted phase offset. Again, as the AGC resistance has a very fine step resolution, consequently a fine phase resolution of ~0.1 degree can again be achieved.

Figure 6:
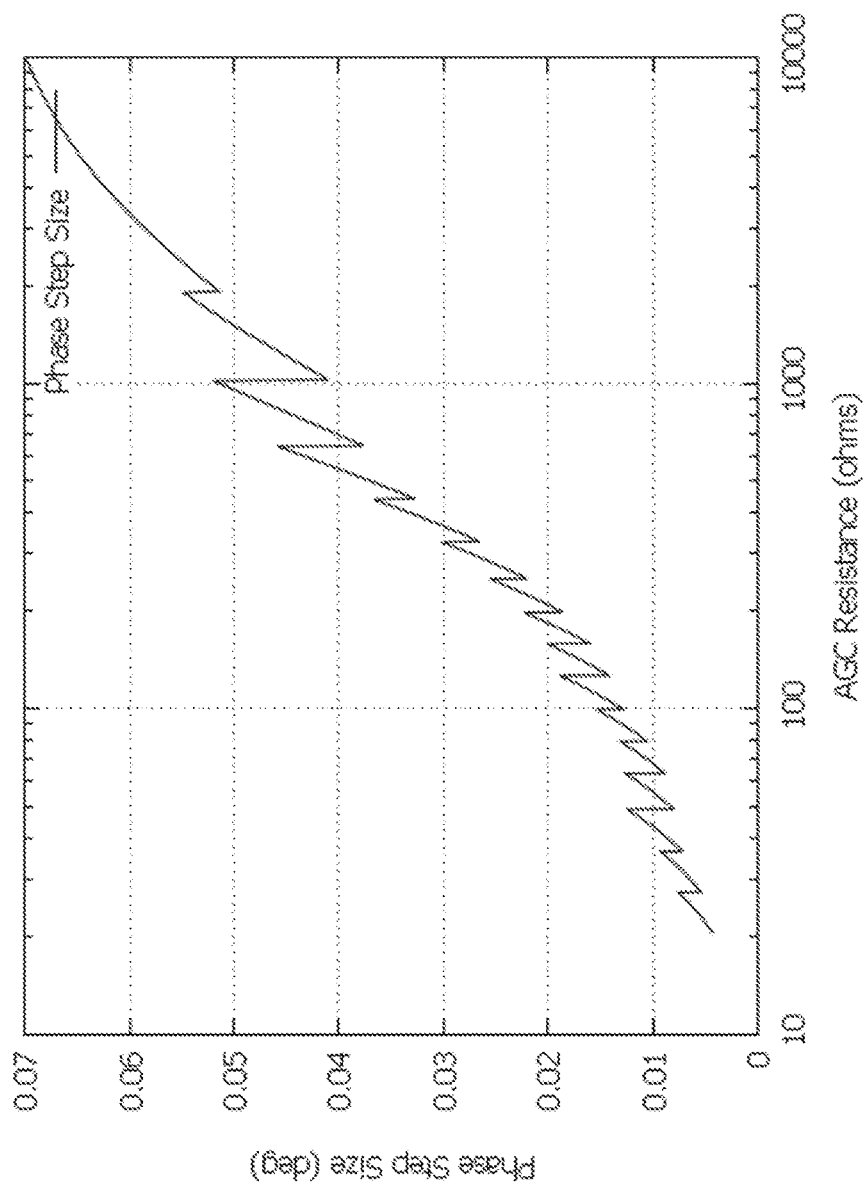
FIG. 6 shows a minimum phase step size (i.e., resolution) plotted over AGC resistance.

FIG. 6 shows a minimum phase step size (i.e., resolution) plotted over AGC resistance. FIG. 6 shows that the phase resolution for a system based on using the RF attenuator to tune the phase is <0.1 degree, which is a considerable improvement versus the phase resolution of 5 degrees that can be expected for PLL. The graph of phase resolution in FIG. 6 shows discontinuities (or spikes) that are caused by the $R_{agc}$ implementation. These discontinuities (or spikes) can be readily compensated by a software algorithm.

In particular, FIG. 6 shows that the minimum phase step size (i.e., resolution) is lower for smaller AGC resistance, and higher for larger AGC resistance. However, it can be seen in FIG. 6 show that the minimum phase resolution for a system based on using the RF attenuator to tune the phase is always <0.1 degree. And this is a considerable improvement versus the phase resolution of 5 degrees that can be expected for PLL.

Figure 7:
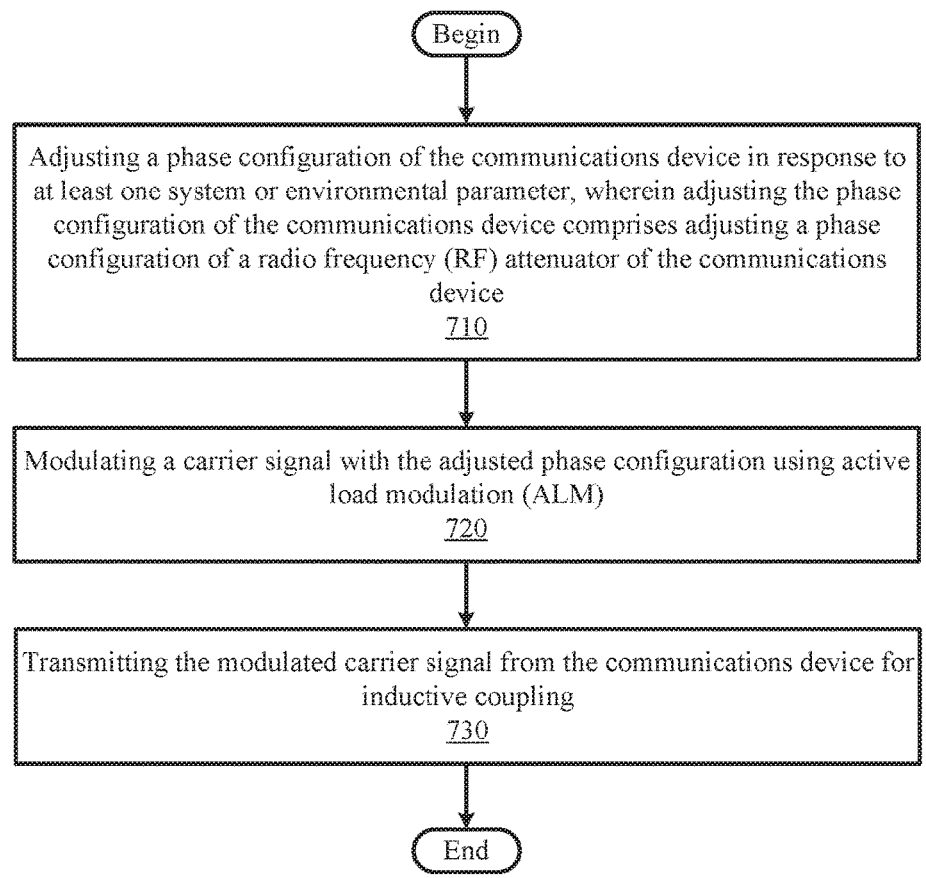
FIG. 7 shows an embodiment of a method of the invention.

FIG. 7 shows an embodiment of a method of the invention. As shown in FIG. 7, the method 700 begins at step 710, where the method adjusts a phase configuration of the communications device in response to at least one system or environmental parameter, wherein adjusting the phase configuration of the communications device comprises adjusting an attenuation factor of a radio frequency (RF) attenuator of the communications device. Then, the method proceeds to step 720. In step 720, the method modulates a carrier signal with the adjusted phase configuration using active load modulation (ALM). Next, at step 730, the method transmits the modulated carrier signal from the communications device for inductive coupling.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enhancing phase tuning resolution of a communications device that communicates via inductive coupling, the method comprising:
    adjusting a phase configuration of the communications device in response to at least one system or environmental parameter;
    modulating a carrier signal with the adjusted phase configuration using active load modulation (ALM); and
    transmitting the modulated carrier signal from the communications device for inductive coupling,
    wherein adjusting the phase configuration of the communications device comprises adjusting an attenuation factor of a radio frequency (RF) attenuator of the communications device.

2. The method of claim 1, wherein adjusting the attenuation factor of the radio frequency (RF) attenuator of the communications device provides for high resolution phase tuning.

3. The method of claim 2, wherein the radio frequency (RF) attenuator is configured to attenuate input voltage to an analog receiver of the communications device.

4. The method of claim 3, wherein the radio frequency (RF) attenuator is further configured to maintain input voltage to an analog receiver of the communications device within a given range, wherein the given range does not overload the analog receiver or provide an input voltage that is too low.

5. The method of claim 4, wherein the attenuation factor of the radio frequency (RF) attenuator is adjusted by changing an impedance ratio.

6. The method of claim 4, wherein the radio frequency (RF) attenuator is comprised of two impedances, wherein at least one of the two impedance is a tunable impedance.

7. The method of claim 4, wherein the radio frequency (RF) attenuator is comprised of a fixed impedance and a tunable impedance in series, wherein the tunable impedance comprises a $R_{agc}$ (automatic gain control resistance) in parallel with a capacitance, wherein the $R_{agc}$ is a variable resistor.

8. The method of claim 7, wherein the $R_{agc}$ is comprised of a bank of resistors controlled by transistors.

9. The method of claim 8, wherein the $R_{agc}$ has a very fine step resolution that allows for a phase tuning of less than 0.1 degree.

10. The method of claim 1, wherein the at least one system or environmental parameter is selected from the group consisting of:
    a field strength of inductive coupling;
    a coupling condition of inductive coupling;
    an antenna geometry of the communications device or a corresponding reader device;
    a process, voltage and temperature (PVT) variation of the communications device;
    a system architecture of the communications device;
    a matching network characteristic of the communications device;
    a communications protocol of the communications device;

a communications data rate of the communications device;

a retransmission configuration of the communications device;

a reconfiguration setting of the communications device;

a communications timing of the communications device; and an application of the communications device.

11. The method of claim 1, wherein adjusting the phase configuration of the communications device comprises adjusting the phase configuration of the communications device according to a function of a group of system or environmental parameters.

12. The method of claim 1, wherein adjusting the phase configuration of the communications device comprises adjusting a phase configuration of a clock generation circuit of the communications device.

13. A system for enhancing phase tuning resolution of a communications device that communicates via inductive coupling, the system comprising:

a phase configuration adjustment module configured to adjust a phase configuration of the communications device in response to at least one system or environmental parameter;

a signal modulation module configured to modulate a carrier signal with the adjusted phase configuration using active load modulation (ALM);

a signal transmission module configured to transmit the modulated carrier signal from the communications device for inductive coupling; and a radio frequency (RF) attenuator configured to attenuate input signal to an analog receiver by an attenuation factor, wherein the phase configuration adjustment module is further configured to adjust the attenuation factor of the radio frequency (RF) attenuator.

14. The system of claim 13, wherein adjusting the attenuation factor of the radio frequency (RF) attenuator provides for high resolution phase tuning.

15. The system of claim 14, wherein the radio frequency (RF) attenuator is further configured to maintain input voltage to the analog receiver of the communications device within a given range, wherein the given range does not overload the analog receiver or provide an input voltage that is too low.

16. The system of claim 15, wherein the radio frequency (RF) attenuator is comprised of two impedances, wherein at least one of the two impedance is a tunable impedance.

17. The system of claim 15, wherein the radio frequency (RF) attenuator is comprised of a fixed impedance and a tunable impedance in series, wherein the tunable impedance comprises a $R_{agc}$ (automatic gain control resistance) in parallel with a capacitance, wherein the $R_{agc}$ is a variable resistor.

18. The system of claim 17, wherein the $R_{agc}$ comprises a bank of resistors controlled by transistors.

19. A computer program product embodied in a non-transitory computer readable medium, when executed by a computer, to enhance phase tuning resolution of a communications device that communicates via inductive coupling, the computer program product comprising:

computer code for adjusting a phase configuration of the communications device in response to at least one system or environmental parameter;

computer code for modulating a carrier signal with the adjusted phase configuration using active load modulation (ALM); and computer code for transmitting the modulated carrier signal from the communications device for inductive coupling, wherein adjusting the phase configuration of the communications device comprises adjusting an attenuation factor of a radio frequency (RF) attenuator of the communications device.

20. The computer program product of claim 19, wherein adjusting the attenuation factor of the radio frequency (RF) attenuator of the communications device provides for high resolution phase tuning.

* * * * *